(12) United States Patent
Ohnishi et al.

(10) Patent No.: US 10,680,922 B2
(45) Date of Patent: Jun. 9, 2020

(54) COMMUNICATION CONTROL APPARATUS AND COMMUNICATION CONTROL METHOD

(71) Applicant: Panasonic Intellectual Property Corporation of America, Torrance, CA (US)

(72) Inventors: Ryota Ohnishi, Hyogo (JP); Takahiro Yoneda, Osaka (JP); Eiichi Muramoto, Osaka (JP); Yuki Minoda, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 217 days.

(21) Appl. No.: 15/195,622

(22) Filed: Jun. 28, 2016

(65) Prior Publication Data

US 2017/0012845 A1    Jan. 12, 2017

(30) Foreign Application Priority Data

Jul. 9, 2015 (JP) .................................. 2015-137367
Feb. 15, 2016 (JP) .................................. 2016-026202

(51) Int. Cl.
*H04L 12/26* (2006.01)
*H04L 12/721* (2013.01)

(52) U.S. Cl.
CPC .......... *H04L 43/0829* (2013.01); *H04L 45/72* (2013.01)

(58) Field of Classification Search
USPC ....................................................... 370/252
See application file for complete search history.

(56) References Cited

U.S. PATENT DOCUMENTS

2010/0085907 A1* 4/2010 Yasumoto ............. H04W 88/04
                                                                370/315
2013/0182568 A1* 7/2013 Lee ....................... H04L 47/127
                                                                370/231
(Continued)

FOREIGN PATENT DOCUMENTS

JP          2014-534495         12/2014

OTHER PUBLICATIONS

Alexander Afanasyev et al., "NFD Developer's Guide" NDN, Technical Report NDN-0021, seached on Jul. 7, 2015 on the Internet <URL: http://named-data.net/wp-content/uploads/2014/07/NFD-developer-guide_pdf>.

*Primary Examiner* — Gregory B Sefcheck
*Assistant Examiner* — Majid Esmaeilian
(74) *Attorney, Agent, or Firm* — Greenblum & Bernstein, P.L.C.

(57) ABSTRACT

A communication control apparatus connected to a content-oriented network includes a transmitter, a receiver, a memory, and a processor. The transmitter transmits an interest packet requesting a plurality of pieces of content. The receiver receives a first data packet including (i) a first piece of content, which is one of the pieces of content, and (ii) first PIT information representing a name of a second piece of content, which is another of the pieces of content and which has not been transmitted from a transmission source. The memory stores a transmission PIT in which names of the pieces of content are registered. The processor registers, in response to transmission of the interest packet, the names of the pieces of content registered in the transmission PIT, and deletes, in response to reception of the first data packet, a name of the first piece of content from the transmission PIT.

10 Claims, 9 Drawing Sheets

(56) References Cited

U.S. PATENT DOCUMENTS

| | | | |
|---|---|---|---|
| 2014/0129736 A1* | 5/2014 | Yu | H04L 45/08 |
| | | | 709/242 |
| 2014/0204945 A1* | 7/2014 | Byun | H04L 45/74 |
| | | | 370/392 |
| 2014/0237085 A1* | 8/2014 | Park | G06Q 50/10 |
| | | | 709/219 |
| 2014/0298103 A1 | 10/2014 | Mullender | |
| 2016/0164792 A1* | 6/2016 | Oran | H04L 47/283 |
| | | | 370/236 |
| 2016/0182680 A1* | 6/2016 | Stapp | H04L 67/2842 |
| | | | 709/217 |
| 2016/0366620 A1* | 12/2016 | Royon | H04L 67/10 |

\* cited by examiner

| direction | name | face |
|---|---|---|
| incoming | a | eth1 |
| | b | eth0 |
| | c | eth0 |
| outgoing | a | eth0 |
| | b | eth1 |
| | | |

COMMUNICATION CONTROL APPARATUS AND COMMUNICATION CONTROL METHOD

BACKGROUND

1. Technical Field

The present disclosure relates to a communication control apparatus connected to a content-oriented network and a communication control method. Specifically, the present disclosure relates to a technique for detecting packet loss.

2. Description of the Related Art

In recent years, content-oriented networking represented by content centric networking (CCN) has been suggested to be next-generation networking that will replace Internet protocol (IP) based networking. For example, Alexander Afanasyev and other 22 authors, "NFD Developer's Guide" online, NDN, Technical Report NDN-0021, searched on Jul. 7, 2015 on the Internet <URL: http://named-data.net/wp-content/uploads/2014/07/NFD-developer-guide.pdf> discloses a technique for distributing content by using CCN.

The characteristic of communication using content-oriented networking is that identification information about content (for example, the name of content), not identification information about an apparatus storing the content (for example, an IP address), is used to obtain the content. In communication using typical CCN, a receiver-side apparatus (client) transmits an interest packet about content without designating a destination apparatus and receives a data packet of the content corresponding to the transmitted interest packet from any one of apparatuses on the CCN.

Japanese Unexamined Patent Application Publication (Translation of PCT Application) No. 2014-534495 discloses a method for detecting the occurrence of packet loss in CCN. Specifically, each client measures a time period elapsed since transmission of an interest packet and determines that packet loss has occurred if no data packets are received by the time indicated by a predetermined threshold (timeout value).

United States Patent Application No. 2014-0237085 discloses a method in which a receiver of data packets of content checks sequence numbers of received data packets and determines that packet loss has occurred if discontinuation of the sequence numbers is detected.

SUMMARY

However, further improvements are required to detect packet loss in CCN.

In one general aspect, the techniques disclosed here feature a communication control apparatus connected to a content-oriented network. The communication control apparatus includes a transmitter that transmits an interest packet requesting a plurality of pieces of content; a receiver that receives a first data packet including (i) a first piece of content, which is one of the plurality of pieces of content corresponding to the interest packet, and (ii) first pending interest table (PIT) information representing a name of a second piece of content, which is another of the plurality of pieces of content corresponding to the interest packet and which has not been transmitted from a transmission source; a memory that stores a transmission PIT in which names of the plurality of pieces of content requested by the interest packet, transmitted by the transmitter, are registered; and a processor that registers, in response to transmission of the interest packet by the transmitter, the names of the plurality of pieces of content requested by the interest packet in the transmission PIT, and that deletes, in response to reception of the first data packet by the receiver, a name of the first piece of content included in the first data packet from the names of the plurality of pieces of content registered in the transmission PIT. The processor detects packet loss based on the first PIT information included in the first data packet and the transmission PIT.

These general and specific aspects may be implemented using a system, a method, and a computer program, and any combination of systems, methods, and computer programs.

According to the present disclosure, it is possible to more appropriately detect packet loss in a content-oriented network.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

Hereinafter, a description will be given of underlying knowledge forming the basis of the present disclosure.

Figure 1:
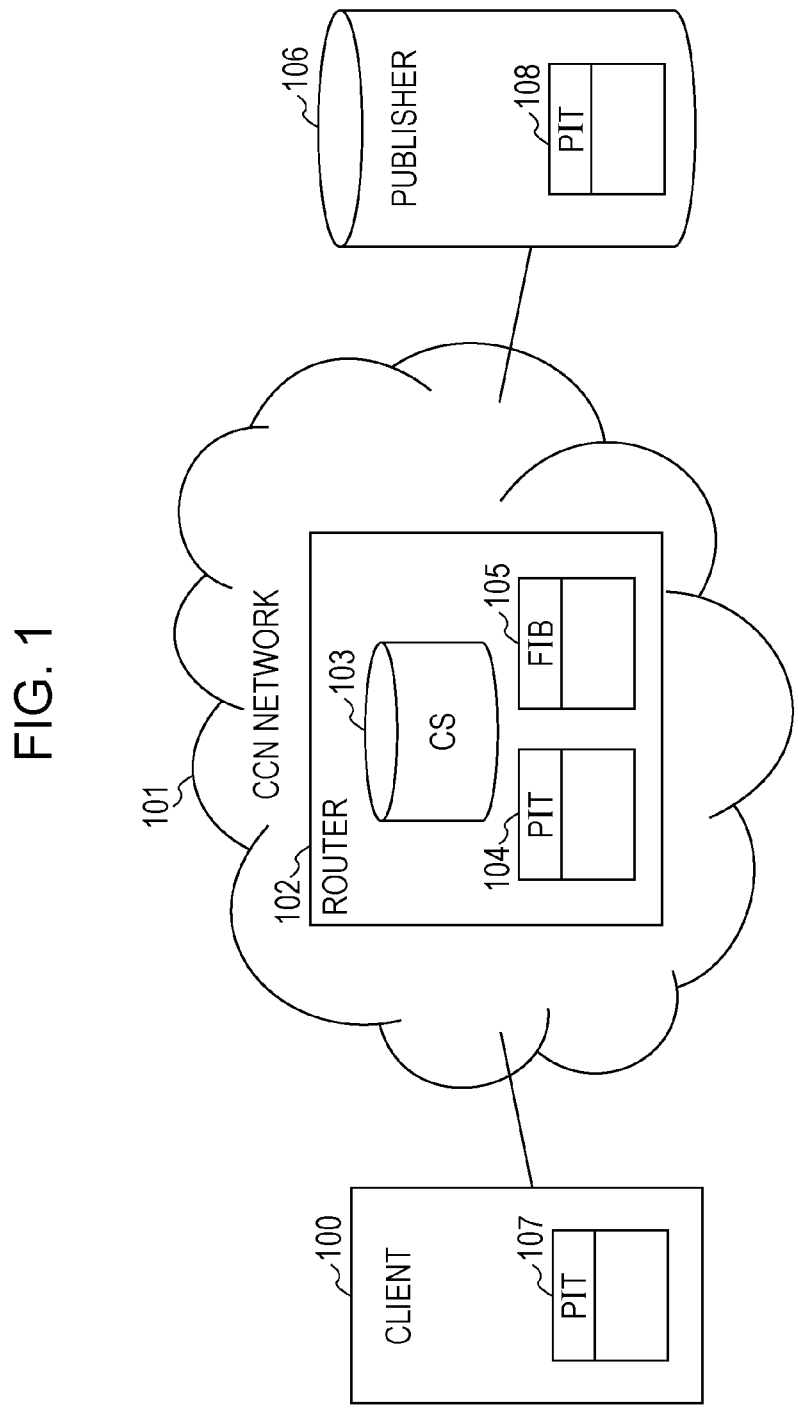
FIG. 1 is a diagram illustrating an example of the configuration of a communication control system using a CCN network.

FIG. 1 is a diagram illustrating an example of the configuration of a communication control system using a network of content centric networking (hereinafter referred to as a CCN network). A client 100 that requests content is connected to a publisher 106 that provides the content via a CCN network 101. Data of the content is transmitted and received via a communication interface called a face. One or more routers 102 are connected to the CCN network 101.

The router 102 includes a content store (CS) 103 that stores data of content distributed over the CCN network 101, a pending interest table (PIT) 104 in which interest packets that have been received and forwarded are recorded, and a forwarding information base (FIB) 105 that indicates paths through which interest packets are to be forwarded.

In CCN, communication is performed by using the name of content as an identifier and also the CS 103 included in each router 102 on the CCN network 101 is used. Accordingly, data distribution can be performed more efficiently when a plurality of clients 100 obtain the same content. The client 100 and the publisher 106 include a PIT 107 and a PIT 108, respectively. The PITs 104, 107, and 108 have the same configuration and thus will be referred to as a PIT 200 when they are correctively referred to in the following description.

Now, a description will be given of the configuration of the PIT 200, a method for recording information in the PIT 200, and a method for deleting information from the PIT 200.

Figures 2, 3:
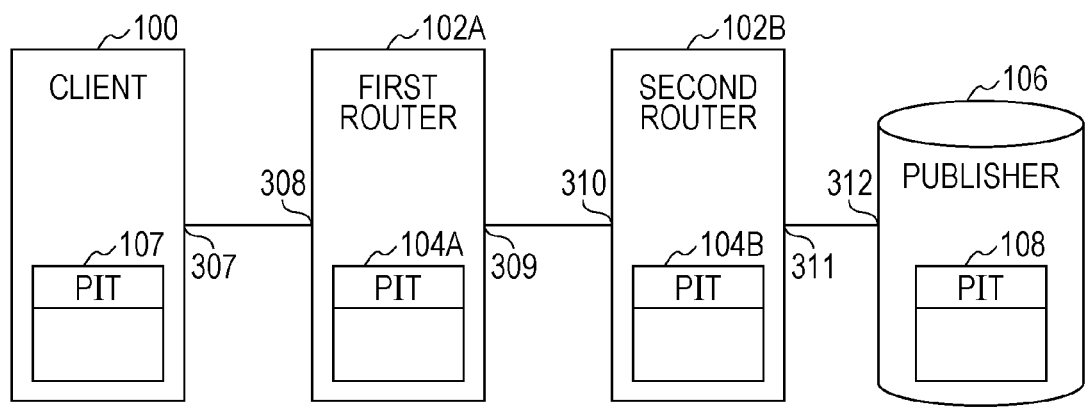
FIG. 2 is a diagram illustrating an example of the configuration of a PIT.
FIG. 3 is a diagram illustrating an example of schematic configurations of individual apparatuses connected to the CCN network.

FIG. 2 is a diagram illustrating an example of the configuration of the PIT 200. Entries are recorded in the PIT 200. Each entry is formed of an attribute 201 indicating the direction of an interest packet (received or transmitted), a name 202 of content requested by the interest packet, and a face 203 (face information) representing the face that has received the interest packet, which are combined (associated with one another).

The PIT 200 includes a reception PIT 204 and a transmission PIT 205. An entry regarding a received interest packet, that is, an entry with the attribute 201 "incoming" in FIG. 2, is recorded in the reception PIT 204. An entry regarding a transmitted interest packet, that is, an entry with the attribute 201 "outgoing" in FIG. 2, is recorded in the transmission PIT 205.

As an example, it is assumed that the router 102 receives an interest packet requesting content with the name "a" by using the face "eth1" and then sends out the interest packet from the face "eth0".

In this case, the router 102 records an entry formed of a combination of the attribute 201 "incoming", the name 202 "a", and the face 203 "eth1" in the reception PIT 204, as illustrated in FIG. 2. Also, the router 102 records an entry formed of a combination of the attribute 201 "outgoing", the name 202 "a", and the face 203 "eth0" in the transmission PIT 205, as illustrated in FIG. 2.

As another example, it is assumed that the router 102 receives an interest packet requesting content with the name "c" by using the face "eth0" and is then performing a process of forwarding the interest packet. That is, the router 102 has not transmitted the interest packet.

In this case, the router 102 records only an entry formed of a combination of the attribute 201 "incoming", the name 202 "c", and the face 203 "eth0" in the reception PIT 204, as illustrated in FIG. 2, and does not record any entry in the transmission PIT 205.

The router 102 may forward (receive and transmit) an interest packet and thus records an entry in both the reception PIT 204 and the transmission PIT 205. On the other hand, the client 100 only transmits an interest packet and thus records an entry only in the transmission PIT 205. The publisher 106 only receives an interest packet and thus records an entry only in the reception PIT 204.

Hereinafter, an entry stored in the reception PIT 204 is referred to as an entry of the reception PIT 204, and an entry stored in the transmission PIT 205 is referred to as an entry of the transmission PIT 205.

An entry of the transmission PIT 205 is deleted in response to reception of a data packet corresponding to the entry. The data packet corresponding to the entry of the transmission PIT 205 is a data packet corresponding to a transmitted interest packet. The data packet corresponding to a transmitted interest packet is a data packet forming the content requested by the interest packet.

For example, it is assumed that an entry formed of a combination of the attribute 201 "outgoing", the name 202 "a", and the face 203 "eth0" is recorded in the transmission PIT 205, as illustrated in FIG. 2. In this case, it is assumed that the face "eth0" receives a data packet forming content with the name "a". In this case, the router 102 deletes the entry of the transmission PIT 205 corresponding to the data packet (the combination of the attribute 201 "outgoing", the name 202 "a", and the face 203 "eth0").

That is, by referring to entries of the transmission PIT 205, a user can grasp information regarding an unreceived data packet among data packets corresponding to interest packets transmitted by the router 102 and the client 100.

For example, by referring to the name 202 included in an entry of the transmission PIT 205, the user can grasp the name of content formed of an unreceived data packet. Also, by referring to the face 203 included in the entry of the transmission PIT 205, the user can grasp the face that has sent out the interest packet corresponding to the unreceived data packet.

As described above, an entry of the transmission PIT 205 (unreceived data information) represents an unreceived data packet among data packets corresponding to a transmitted interest packet.

On the other hand, an entry of the reception PIT 204 is deleted in response to transmission of a data packet corresponding to the entry. The data packet corresponding to the entry of the reception PIT 204 is a data packet corresponding to an interest packet corresponding to the entry, that is, a received interest packet.

For example, it is assumed that an entry formed of a combination of the attribute 201 "incoming", the name 202 "c", and the face 203 "eth0" is recorded in the reception PIT 204, as illustrated in FIG. 2. In this case, it is assumed that the face "eth0" sends out a data packet forming content with the name "c". In this case, the router 102 deletes the entry of the reception PIT 204 corresponding to the data packet (the combination of the attribute 201 "incoming", the name 202 "c", and the face 203 "eth0").

That is, by referring to entries of the reception PIT 204, a user can grasp information regarding an untransmitted data packet among data packets corresponding to interest packets received by the router 102 and the publisher 106.

For example, by referring to the name 202 included in an entry of the reception PIT 204, the user can grasp the name of content formed of an untransmitted data packet. Also, by referring to the face 203 included in the entry of the reception PIT 204, the user can grasp the face that has received the interest packet corresponding to the untransmitted data packet.

As described above, an entry of the reception PIT 204 (untransmitted data information) represents an untransmitted data packet among data packets corresponding to a received interest packet.

In this way, transmission, reception, and forwarding of interest packets and data packets are controlled by using the reception PIT 204 and the transmission PIT 205 in CCN.

However, communication using CCN may be provided as a best-effort service (without quality assurance), like IP communication according to the related art. In other words, packet loss may occur in communication using CCN due to the capacity of a network or the quality of a communication link. Thus, there is a demand for techniques that enable highly reliable communication in CCN in order to realize stable communication using CCN. Specifically, there is a demand for techniques for detecting packet loss and performing retransmission to recover a lost packet.

In IP communication according to the related art, a router does not typically have a state about data forwarding. Thus, detection of packet loss and retransmission of a lost packet are typically performed through end-to-end (E2E) approach performed by only a client or server located at both ends of a network.

On the other hand, the router 102 in CCN holds, in the PIT 200, states about a received interest packet and a forwarded interest packet in order to perform routing by using the name of content. Thus, in communication using CCN, detection of packet loss and retransmission of a lost packet can be performed by the router 102 located along a forwarding path for a data packet.

In this way, in communication using CCN, the router 102 located along the forwarding path performs retransmission. Thus, packet loss can be quickly detected and a request for retransmission can be quickly made compared to the E2E approach in which retransmission is performed between the publisher 106 and the client 100 located at the ends of the forwarding path. As a result, an influence of delay in data arrival or the like, caused by packet loss, can be reduced.

However, it is necessary to appropriately detect packet loss so that the router 102 located along the forwarding path performs efficient retransmission. Accordingly, Japanese Unexamined Patent Application Publication (Translation of PCT Application) No. 2014-534495 discloses a method in which each client measures a time period elapsed since transmission of an interest packet and determines that packet loss has occurred if no data packets are received by the time indicated by a predetermined threshold (timeout value). United States Patent Application No. 2014-0237085 discloses a method in which an apparatus that has requested content checks the sequence numbers of received data packets and determines that packet loss has occurred if skip (discontinuation) of the sequence numbers is detected.

However, even if the methods disclosed in Japanese Unexamined Patent Application Publication (Translation of PCT Application) No. 2014-534495 and United States Patent Application No. 2014-0237085 are used, it is difficult to appropriately detect packet loss in communication using CCN.

In the method disclosed in Japanese Unexamined Patent Application Publication (Translation of PCT Application) No. 2014-534495, it is very important to set a timeout value to an appropriate value in order to detect packet loss. To determine a timeout value, it is necessary to steadily observe the time required to obtain data of content and to calculate an optimum timeout value on the basis of the value obtained through the observation. However, in communication using CCN, the time required to obtain data of content dynamically changes and thus it is difficult to apply this method.

In the case of continuously obtaining data of content held by the same publisher 106, the time required to obtain the data of content significantly varies depending on whether the data of content is stored only in the publisher 106 or is also stored in the CS 103 of the router 102 in CCN. The result is observed as variations of the time required to obtain the data of content.

For example, in the case of obtaining the data of content from the CS 103 of the router 102, the data of content can be obtained in a shorter time than in the case of obtaining the data from the publisher 106. However, the client 100 is not able to predict which is the source of the data of content, the CS 103 of the router 102 or the publisher 106.

Thus, if the timeout value is set in accordance with the time required to obtain the data transmitted from the CS 103 of the router 102 and if the data is actually transmitted from the publisher 106 without the occurrence of packet loss, the elapsed time period exceeds the timeout value and false detection of packet loss occurs although no packet loss actually occurs, which may result in unnecessary retransmission.

On the contrary, if the timeout value is set in accordance with the time required to obtain the data transmitted from the publisher 106, packet loss that occurs when the data is transmitted from the CS 103 of the router 102 is not quickly detected, which increases delay in data arrival due to the packet loss.

On the other hand, the method disclosed in United States Patent Application No. 2014-0237085 is a method that is generally used in real-time communication using the IP. However, in communication using CCN, the arrival order of data packets easily changes in accordance with whether content is received from the publisher 106 or from the CS 103 of the router 102, or in accordance with the router 102 from which the data packets are received. Thus, skip (discontinuation) of sequence numbers easily occurs even if no packet loss occurs. As a result, false detection of packet loss may occur.

One non-limiting and exemplary embodiment provides a technique that enables more appropriate detection of packet loss in a content-oriented network.

A communication control apparatus according to an aspect of the present disclosure is a communication control apparatus connected to a content-oriented network, including a transmitter that transmits an interest packet requesting a plurality of pieces of content; a receiver that receives a first data packet including (i) a first piece of content, which is one of the plurality of pieces of content corresponding to the interest packet, and (ii) first pending interest table (PIT) information representing a name of a second piece of content, which is another of the plurality of pieces of content corresponding to the interest packet and which has not been transmitted from a transmission source; a memory that stores a transmission PIT in which names of the plurality of pieces of content requested by the interest packet, transmitted by the transmitter, are registered; and a processor that registers, in response to transmission of the interest packet by the transmitter, the names of the plurality of pieces of content requested by the interest packet in the transmission PIT, and that deletes, in response to reception of the first data packet by the receiver, a name of the first piece of content included in the first data packet from the names of the plurality of pieces of content registered in the transmission PIT. The processor detects packet loss based on the first PIT information included in the first data packet and the transmission PIT.

With this configuration, a data packet that has not been received among data packets corresponding to an interest packet transmitted by the transmitter can be grasped by using unreceived data information recorded in the transmission PIT stored in the memory. Also, if a data packet received by the receiver includes PIT information, the apparatus as a transmission destination of the interest packet can grasp the data packet that has not been transmitted by using the PIT information.

Thus, according to the above-described configuration, packet loss of a data packet corresponding to an interest packet can be appropriately detected by determining the mismatch between a data packet that has not been received and that is grasped by using the transmission PIT and a data packet that has not been transmitted by the apparatus as a transmission destination of the interest packet and that is grasped by using the PIT information.

In the foregoing aspect, the receiver may further receive the interest packet, the transmitter may further transmit a second data packet, the memory may further store a reception PIT in which the names of the plurality of pieces of content requested by the interest packet, received by the receiver, are registered, and the processor may generate the second data packet including (i) the first piece of content included in the first data packet, received by the receiver, and (ii) the reception PIT, may register, in response to reception of the interest packet by the receiver, the names of the plurality of pieces of content requested by the interest packet in the reception PIT, and may delete, in response to transmission of the second data packet by the transmitter, the name of the first piece of content included in the second data packet from the names of the plurality of pieces of content registered in the reception PIT.

With this configuration, untransmitted data information recorded in the reception PIT is included as PIT information in a data packet to be transmitted to another apparatus by the transmitter. Accordingly, the other apparatus is able to grasp a data packet that has not been transmitted by the apparatus as a transmission destination of the interest packet among data packets corresponding to the interest packet transmitted thereby, by using the untransmitted data information included as PIT information in the received data packet.

As a result, the other apparatus is able to appropriately detect packet loss of a data packet corresponding to the interest packet by determining the mismatch between the grasped data packet and a data packet that has not been received among data packets corresponding to the interest packet transmitted thereby.

In the foregoing aspect, the processor may register or delete a set of the names of the plurality of pieces of content requested by the interest packet, received by the receiver, and face information representing a communication interface that receives the interest packet, in the reception PIT or from the reception PIT, and may generate the second data packet by using a first reception PIT that matches first face information corresponding to the first piece of content.

With this configuration, face information included in untransmitted data information representing a data packet to be transmitted by the transmitter is extracted from the reception PIT. Accordingly, with use of the extracted face information, the communication interface that has received the interest packet corresponding to the data packet can be specified. As a result, it is determined that the data packet needs to be transmitted by the specified communication interface, and the specified communication interface can be specified as a face that sends out the data packet.

Also, with this configuration, untransmitted data information that is recorded in the reception PIT and that includes face information identical to the extracted face information is included as PIT information in the data packet to be transmitted by the transmitter. Accordingly, the untransmitted data information representing the data packet that needs to be sent out by the communication interface identical to the specified communication interface and that has not been sent out is included in the data packet to be transmitted by the transmitter. Then the data packet is sent out by the specified communication interface.

Therefore, another apparatus that has received the data packet is able to grasp a data packet that has not been sent out by the communication interface that has received the interest packet transmitted thereby, by using the untransmitted data information included as PIT information in the data packet.

As a result, if the grasped data packet does not match the data packet that corresponds to the interest packet transmitted by the other apparatus and that has not been received, the other apparatus is able to appropriately detect packet loss of the data packet corresponding to the interest packet.

In the foregoing aspect, the processor may compare the first PIT information included in the first data packet with the transmission PIT, may determine that the packet loss has occurred if the names of the plurality of pieces of content registered in the transmission PIT include a name of a third piece of content different from the first and second pieces of content, and may cause the transmitter to transmit a further interest packet requesting the third piece of content.

With this configuration, if the data packet that has not been transmitted and that is represented by the PIT information does not match the data packet that has not been received and that is represented by unreceived data information recorded in the transmission PIT, packet loss of the data packet that does not match can be appropriately detected.

In the foregoing aspect, the processor may not use, for detecting the packet loss, one of the names of the plurality of pieces of content that has been registered in the transmission PIT for a predetermined time period.

For example, it is assumed that a first apparatus with the above-described configuration transmits a first interest packet and then a second apparatus transmits, before receiving the first interest packet, a second data packet corresponding to a second interest packet that has previously been received. In this case, the second apparatus, which has not received the first interest packet, is not able to include, in the second data packet, PIT information indicating that a first data packet corresponding to the first interest packet has not been transmitted.

After that, in the first apparatus, the receiver receives the second data packet before the time period elapsed since unreceived data information representing the first data packet is recorded in the transmission PIT reaches a predetermined threshold.

In this case, the first apparatus with the above-described configuration performs the above-described comparison without using the unreceived data information indicating the first data packet recorded in the transmission PIT. Thus, since the data packet represented by the PIT information included in the second data packet does not include the first data packet, false detection of packet loss of the first data packet can be prevented.

In the foregoing aspect, the processor may further set a timeout value to the transmission PIT, may determine that the packet loss has occurred if a time period from when one of the names of the plurality of pieces of content is registered in the transmission PIT to when the receiver receives a piece of content corresponding to the one of the names exceeds the timeout value, and may cause the transmitter to transmit a further interest packet corresponding to the packet loss. Also, the processor may further set a timeout value to the unreceived data information recorded in the transmission PIT, may detect packet loss of the data packet if a time period from when the unreceived data information is recorded in the transmission PIT to when the receiver receives the data packet indicated by the unreceived data information exceeds the timeout value, and may cause the transmitter to retransmit the interest packet corresponding to the data packet.

With this configuration, every time the time period elapsed since the unreceived data information corresponding to the data packet is recorded in the transmission PIT exceeds the timeout value, packet loss of the data packet is detected and the interest packet corresponding to the data packet is retransmitted.

Thus, even if packet loss of the data packet corresponding to the interest packet occurs, the data packet can be appropriately retransmitted. As a result, the data packet can be reliably obtained.

In the foregoing aspect, in a case of receiving the first piece of content, that includes a plurality of content segments by using a plurality of data packets, the receiver may receive a third data packet including (i) a first content segment, which is one of the plurality of content segments, and (ii) second PIT information representing a name of a second content segment, which is one of the plurality of content segments corresponding to the interest packet and which has not been transmitted from a transmission source, and the processor may register, in response to the transmission of the interest packet by the transmitter, names of the plurality of content segments of the plurality of pieces of content requested by the interest packet in the transmission PIT, may delete, in response to reception of the third data packet by the receiver, a name of the first content segment included in the third data packet from the names of the plurality of content segments of the plurality of pieces of content registered in the transmission PIT, and may detect the packet loss based on the second PIT information included in the third data packet and the transmission PIT.

It is assumed that the transmitter continuously transmits a plurality of data packets forming one piece of content in a concentrated manner in a certain period. In such a case, according to this configuration, untransmitted data information that is recorded in the reception PIT and that represents a data packet forming another piece of content can be prevented from being included as PIT information in the data packet to be transmitted. Accordingly, the size of PIT information included in the data packet can be reduced in the period. As a result, the communication load of the content-oriented network can be reduced.

In the foregoing aspect, in a case where the transmitter transmits the first piece of content that includes the plurality of content segments by using the plurality of data packets, the receiver may further receive the interest packet, the transmitter may further transmit a fourth data packet, the memory further stores a reception PIT in which the names of the plurality of content segments of the first piece of content requested by the interest packet, received by the receiver, are registered, and the processor may generate a fourth data packet including (i) the first content segment included in the third data packet, received by the receiver, and (ii) the reception PIT, may register, in response to reception of the interest packet by the receiver, the names of the plurality of content segments of the first piece of content requested by the interest packet in the reception PIT, and may delete, in response to transmission of the fourth data packet by the transmitter, the name of the first content segment included in the fourth data packet from the names of the plurality of content segments registered in reception PIT.

It is assumed that the receiver continuously receives a plurality of data packets forming one piece of content in a concentrated manner in a certain period. In such a case, according to this configuration, only packet loss of a data packet forming the piece of content can be detected in a concentrated manner by using the PIT information included in the received data packets and the unreceived data information recorded in the transmission PIT and representing the data packets forming the piece of content.

In the foregoing aspect, the interest packet requesting the plurality of pieces of content may include a plurality of interest packets corresponding to the plurality of pieces of content.

The present disclosure discloses not only the above-described communication control apparatus including a processor that executes characteristic processing but also a communication control method for executing the characteristic processing in the communication control apparatus.

The embodiments described below are merely specific examples of the present disclosure. The values, forms, elements, steps, and order of the steps described in the following embodiments are examples and do not limit the present disclosure. Among the elements in the following embodiments, the elements that are not described in the dependent claim indicating the most generic concept will be described as optional elements. In all the embodiments, any combination of the features thereof may be accepted.

First Embodiment

A communication control system using a CCN network according to a first embodiment is characterized in that the publisher 106 and the router 102 transmit information represented by an entry of the reception PIT 204 of the own apparatus to a lower router 102 and the client 100, and is also characterized in that the lower router 102 and the client 100 detect packet loss by using the received information represented by the entry of the reception PIT 204 of the apparatus.

Here, an upper apparatus is an apparatus that is located, viewed from a certain apparatus on the CCN network 101, in the direction in which an interest packet is transmitted (an apparatus as a destination of the interest packet). An apparatus on the CCN network 101 is an apparatus connected to the CCN network 101, that is, the client 100, the router 102, or the publisher 106. A lower apparatus is an apparatus that is located in the direction in which a data packet corresponding to an interest packet is transmitted (an apparatus as a destination of the data packet).

Specifically, an apparatus on the CCN network 101 extracts, in the case of transmitting a data packet to a lower apparatus, the face 203 included in the entry corresponding to the data packet from the reception PIT 204 of the apparatus.

Accordingly, the apparatus specifies the face indicated by the extracted face 203 as the face that has received the interest packet corresponding to the data packet. The apparatus then determines that the data packet needs to be transmitted from the specified face and specifies the face indicated by the extracted face 203 as the face that sends out the data packet.

The apparatus then extracts the name 202 from an entry including the face 203 identical to the foregoing extracted face 203 among the entries recorded in the reception PIT 204 of the apparatus. The apparatus then includes, in the data packet, the extracted name 202 as information representing the data packet that has not been transmitted (hereinafter PIT information). In this way, the apparatus includes, in the data packet, information representing the data packet that needs to be transmitted by the face identical to the foregoing specified face and that has not been sent out.

Subsequently, the apparatus causes the face indicated by the foregoing extracted face 203 to send out the data packet.

On the other hand, the lower apparatus that has received the data packet compares the PIT information that is included in the received data packet and that has been obtained from the entry of the reception PIT 204 of the upper apparatus with an entry including the face 203 identical to the face 203 indicating the face that has received the data packet among the entries of the transmission PIT 205 of the lower apparatus.

As a result of comparison, if the name 202 represented by the PIT information matches the name 202 included in the entry of the transmission PIT 205, the apparatus does not detect packet loss. On the other hand, if the names do not match, the apparatus detects packet loss of a data packet forming the content with the name 202 that does not match. The apparatus then retransmits the interest packet corresponding to the data packet forming the content with the name 202 that does not match in accordance with the entry of the transmission PIT 205 of the apparatus.

In the case of forwarding a received data packet, an apparatus deletes PIT information included in the data packet, includes information representing an entry of the reception PIT 204 of the apparatus as the PIT information in the data packet, and then transmits the data packet to a lower apparatus. That is, the apparatus updates the PIT information included in the received data packet to information represented by the entry of the reception PIT 204 of the apparatus. Accordingly, detection of packet loss can be individually performed for each forwarding path of a data packet, and retransmission control of a lost data packet can be performed.

Hereinafter, a detailed description will be given with reference to the drawings. FIG. 3 is a diagram illustrating an example of schematic configurations of individual apparatuses connected to the CCN network 101 (content-oriented network). The client 100 is connected to the publisher 106 via a first router 102A and a second router 102B corresponding to the above-described router 102. The client 100, the first router 102A, the second router 102B, and the publisher 106 include the PIT 107, a PIT 104A, a PIT 104B, and the PIT 108, respectively.

Reference numeral 307 denotes a face "eth0" included in the client 100. Reference numerals 308 and 309 denote faces "eth0" and "eth1" included in the first router 102A. Reference numerals 310 and 311 denote faces "eth0" and "eth1" included in the second router 102B. Reference numeral 312 denotes a face "eth0" included in the publisher 106.

Hereinafter, a description will be given of a process of detecting packet loss by using an example in which loss of one data packet occurs in a forwarding path (link) for data packets between the first router 102A and the second router 102B when the client 100 requests two pieces of content in the communication control system illustrated in FIG. 3.

Figure 4:
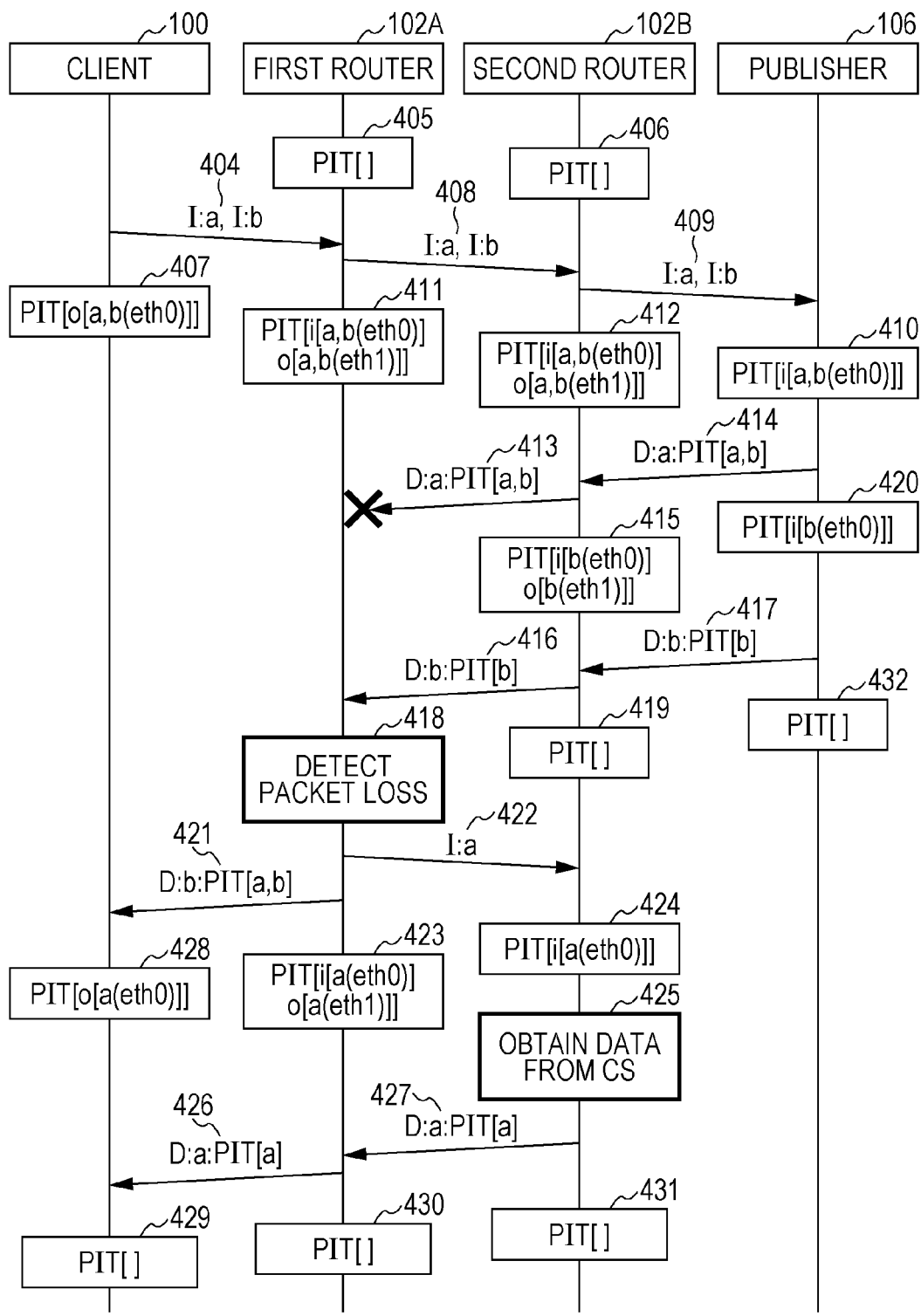
FIG. 4 is a sequence diagram illustrating an example of a process of detecting packet loss in the communication control system.

FIG. 4 is a sequence diagram illustrating an example of a process of detecting packet loss in the communication control system. Hereinafter, a description will be given under the assumption that the client 100 requests two pieces of content with names "a" and "b" and that a data packet forming the content with the name "a" is lost when being transmitted from the second router 102B to the first router 102A.

Content with the name "a" is referred to as content "a". An interest packet requesting the content "a" is referred to as "I:a". A data packet forming the content "b" is referred to as "D:b". If a data packet "D:a" includes the name "a" of content as PIT information, the data packet is referred to as "D:a:PIT[a]". The PIT information is referred to as PIT information "PIT[a]".

An entry of the reception PIT 204 formed of a combination of the attribute "incoming", the name "a", and the face "eth0" is referred to as an entry "i[a(eth0)]" of the reception PIT 204. An entry of the transmission PIT 205 formed of a combination of the attribute "outgoing", the name "a", and the face "eth1" is referred to as an entry "o[a(eth1)]" of the transmission PIT 205.

A state where the PIT 200 (107, 104A, 104B, and 108) includes two entries "i[a(eth0)]" and "i[b(eth0)]" of the reception PIT 204 and two entries "o[a(eth1)]" and "o[b(eth1)]" of the transmission PIT 205 is referred to as "PIT[i[a, b(eth0)]o[a, b(eth1)]]".

It is assumed that no data packets are stored in the CSs 103 of the first router 102A and the second router 102B in an initial state.

Hereinafter, the sequence illustrated in FIG. 4 will be described in order. First, in step 404, the client 100 transmits interest packets "I:a" and "I:b" requesting content "a" and content "b". As a result of the transmission, the client 100 records an entry indicating that the interest packets "I:a" and "I:b" have been sent out by the face "eth0" in the transmission PIT 205. Accordingly, the state of the PIT 107 becomes a state 407 ("PIT[o[a, b(eth0)]]").

In steps 408 and 409, the first router 102A and the second router 102B forward the interest packets "I:a" and "I:b" transmitted in step 404 to the publisher 106. As a result of the forwarding, the first router 102A records an entry "i[a, b(eth0)]" indicating that the face 308 "eth0" has received the interest packets "I:a" and "I:b" in the reception PIT 204. Also, the first router 102A records an entry "o[a, b(eth1)]" indicating that the face 309 "eth1" has sent out the interest packets "I:a" and "I:b" in the transmission PIT 205.

As a result, the state of the PIT 104A of the first router 102A is updated from an initial state 405 "PIT[ ]" in which no entries are recorded to a state 411 "PIT[i[a, b(eth0)]o[a, b(eth1)]]". Likewise, the state of the PIT 104B of the second router 102B is updated from an initial state 406 "PIT[ ]" to a state 412 "PIT[i[a, b(eth0)]o[a, b(eth1)]]".

The publisher 106 receives, by using the face 312 "eth0", the interest packets "I:a" and "I:b" transmitted in step 409 and records an entry indicating the reception in the reception PIT 204. As a result, the state of the PIT 108 is updated from an initial state "PIT[ ]" (not illustrated) to a state 410 "PIT[i[a, b(eth0)]]".

Subsequently, in step 414, the publisher 106 performs a process of transmitting a data packet "D:a" forming the content "a" held thereby. Specifically, upon step 414 being started, the publisher 106 extracts the face 203 "eth0" included in the entry "i[a(eth0)]" corresponding to the data packet "D:a" among the entries "i[a(eth0)]" and "i[b(eth0)]" recorded in the reception PIT 204 of the publisher 106.

Accordingly, the publisher 106 specifies the face 312 "eth0" indicated by the extracted face 203 "eth0" as the face that has received the interest packet corresponding to the data packet "D:a". Also, the publisher 106 determines that it is necessary to transmit the data packet "D:a" from the specified face 312 "eth0" and specifies the specified face 312 "eth0" as the face to send out the data packet "D:a".

Subsequently, the publisher 106 extracts the names 202 "a" and "b" from the entries "i[a(eth0)]" and "i[b(eth0)]" including the face 203 "eth0" identical to the foregoing extracted face 203 "eth0" among the entries "i[a(eth0)]" and "i[b(eth0)]" recorded in the reception PIT 204 of the publisher 106. Subsequently, the publisher 106 includes the extracted names 202 "a" and "b" as PIT information in the data packet "D:a".

In this way, information (the names 202 "a" and "b") about the entries "i[a(eth0)]" and "i[b(eth0)]" corresponding to the data packets "D:a" and "D:b" that need to be sent out by the face 312 "eth0" identical to the foregoing specified face 312 "eth0" and that have not been sent out is included as PIT information in the data packet "D:a".

Subsequently, the publisher 106 causes the foregoing specified face 312 "eth0" to send out the data packet "D:a:PIT[a, b]" and ends step 414.

After transmitting the data packet "D:a:PIT[a, b]" in step 414, the publisher 106 deletes the entry "i[a(eth0)]" in the reception PIT 204 corresponding to the transmitted data packet "D:a:PIT[a, b]". Accordingly, the publisher 106 updates the state of the PIT 108 from the state 410 "PIT[i[a, b(eth0)]]" to a state 420 "PIT[i[b(eth0)]]".

On the other hand, the second router 102B receives, by using the face 311 "eth1", the data packet "D:a:PIT[a, b]". Subsequently, the second router 102B compares the names of content "a" and "b" represented by the PIT information "PIT[a, b]" included in the received data packet with the names 202 "a" and "b" included in the entries "o[a(eth1)]" and "o[b(eth1)]" including the face 311 "eth1" identical to the face 311 "eth1" that has received the data packet among the entries of the transmission PIT 205 of the second router 102B in the state 412.

In this case, the names of content "a" and "b" represented by the PIT information "PIT[a, b]" match the names 202 of content "a" and "b" obtained from the entries of the transmission PIT 205 of the second router 102B. That is, two data packets forming the pieces of content "a" and "b" represented by the PIT information and have not been transmitted by the publisher 106 as an upper apparatus match two data packets forming the pieces of content "a" and "b" indicated by the entries of the transmission PIT 205 of the second router 102B and have not been received by the second router 102B. Thus, the second router 102B determines that no packet loss has occurred in the forwarding path for data packets between the publisher 106 as an upper apparatus and the second router 102B.

In step 413, the second router 102B performs a process of forwarding the data packet "D:a:PIT[a, b]" received from the publisher 106. Specifically, upon step 413 being started, the second router 102B deletes PIT information from the received data packet "D:a:PIT[a, b]". Subsequently, as in step 414, the second router 102B includes, in the data packet "D:a" from which the PIT information is deleted at the start of step 413, the PIT information "PIT[a, b]" obtained from the entry recorded in the reception PIT 204 of the second router 102B. Subsequently, as in step 414, the second router 102B causes the face 310 "eth0" specified by using the entry recorded in the reception PIT 204 of the second router 102B to send out the data packet "D:a:PIT[a, b]", and ends step 413.

Subsequently, the second router 102B updates the state of the PIT 104B from the state 412 "PIT[i[a, b(eth0)]o[a, b(eth1)]]" to a state 415 "PIT[i[b(eth0)]o[b(eth1)]]". Also, the second router 102B deletes the PIT information included in the data packet "D:a:PIT[a, b]" sent out in step 413 and stores the data packet "D:a" from which the PIT information has been deleted in the CS 103 of the second router 102B.

Subsequently, it is assumed that the data packet "D:a:PIT [a, b]" transmitted in step 413 is lost. At this time, the state of the PIT 104B of the second router 102B is the state 415 "PIT[i[b(eth0)]o[b(eth1)]]". On the other hand, the first router 102A has not received the data packet "D:a:PIT[a, b]" transmitted in step 413. Thus, the state of the PIT 104A of the first router 102A remains the state 411 "PIT[i[a, b(eth0)] o[a, b(eth1)]]" and does not change, and the entry "o[a (eth1)]" corresponding to the data packet "D:a" remains in the transmission PIT 205. Detection of packet loss is performed when the first router 102A receives the data packet of the content "b".

After that, in step 417, the publisher 106 transmits a data packet "D:b:PIT[b]" including PIT information, as in step 414. The second router 102B receives the data packet "D:b:PIT[b]" and then performs a comparison process similar to that described above. As a result, the name "b" of the content represented by the PIT information "PIT[b]" included in the data packet "D:b:PIT[b]" matches the name 202 "b" of the content obtained from the entry of the transmission PIT 205 of the PIT 104B in the state 415, and thus the second router 102B determines that no packet loss has occurred. In step 416, the second router 102B forwards the data packet "D:b:PIT[b]" including the PIT information as in step 413.

The first router 102A receives the data packet "D:b:PIT [b]" transmitted in step 416 and then performs a comparison process similar to that described above. That is, the first router 102A compares the name "b" of the content represented by the PIT information "PIT[b]" included in the received data packet "D:b:PIT[b]" with the names 202 "a" and "b" included in the entry including the face 309 "eth1" identical to the face 309 "eth1" that has received the data packet among the entries of the transmission PIT 205 of the first router 102A in the state 411.

In this case, the name "a" of the content does not match between the name "b" of the content represented by the PIT information "PIT[b]" and the names 202 "a" and "b" of the content obtained from the entry of the transmission PIT 205 of the first router 102A. That is, the data packet forming the content "a" does not match between the data packet forming the content "b" that is represented by the PIT information and that has not been transmitted by the publisher 106 as an upper apparatus and the two data packets forming the pieces of content "a" and "b" that are represented by the entry of the transmission PIT 205 of the first router 102A and that have not been received by the first router 102A. Thus, in step 418, the first router 102A detects that loss of the data packet forming the content "a" has occurred in the forwarding path for data packets between the second router 102B as an upper apparatus and the first router 102A.

After detecting the loss of the data packet forming the content with the name "a", the first router 102A performs step 422. Specifically, in step 422, the first router 102A causes the face "eth1" to send out (retransmit) the interest packet "I:a" corresponding to the data packet "D:a" in accordance with the entry "o[a(eth1)]" corresponding to the data packet "D:a" in the transmission PIT 205 of the first router 102A in the state 411.

In step 421, the first router 102A forwards a data packet "D:b:PIT[a, b]" including the PIT information "PIT[a, b]", as in steps 413 and 416. That is, before forwarding the data packet, the first router 102A includes, in the data packet, the PIT information "PIT[a, b]" obtained from the entry "i[a, b(eth0)]" of the reception PIT 204 of the first router 102A in the state 411.

After receiving the data packet "D:b:PIT[a, b]", the client 100 performs a comparison process similar to that described above. In this case, the names 202 "a" and "b" of content included in the entry "o[a, b(eth0)]" of the transmission PIT 205 in the state 407 match the names "a" and "b" of content represented by the PIT information "PIT[a, b]" included in the data packet. Thus, the client 100 determines that no packet loss has occurred. That is, the client 100 does not detect packet loss and does not retransmit the interest packet.

The second router 102B receives the interest packet "I:a" retransmitted in step 422 and then obtains the data packet "D:a" stored in the CS103 of the second router 102B after step 413 (step 425). Subsequently, the second router 102B performs step 427, which is similar to steps 413 and 416, and the first router 102A performs step 426, which is similar to steps 413 and 416. Accordingly, the client 100 receives the data packet "D:a" corresponding to the interest packet "I:a" retransmitted in step 422.

In a state where all the data packets requested by the client 100 have been forwarded, states 429, 430, 431, and 432 of the PITs 107, 104A, 104B, and 108 of the apparatuses 100, 102A, 102B, and 106 are initial states in which no entries are recorded.

As described above, in the communication control system according to the first embodiment, a data packet including information indicated by an entry of the PIT 200 is transmitted and received, and thereby packet loss can be detected more appropriately and efficient retransmission control can be performed.

In the first embodiment, CCN is used as a representative example of content-oriented networking. A network of content-oriented networking is not limited to the CCN network 101. A network of other types of content-oriented networking, such as named data networking (NDN), may be used.

In the first embodiment, a detailed description is given under the assumption that the communication control apparatus according to the present disclosure is the router 102 (102A, 102B). The communication control apparatus according to the present disclosure is the client 100 connected to the CCN network 101, receives a data packet including PIT Information indicated by an entry of the reception PIT 204 of an upper apparatus and representing a data packet that has not been transmitted, and performs packet loss detection and retransmission control by using the PIT information included in the received data packet. Also, the communication control apparatus according to the present disclosure is the publisher 106 in CCN, receives an interest packet, and transmits a data packet including PIT information representing a data packet that has not been transmitted among data packets corresponding to the received interest packet indicated by the entry of the reception PIT 204 of the publisher 106.

Figure 5:
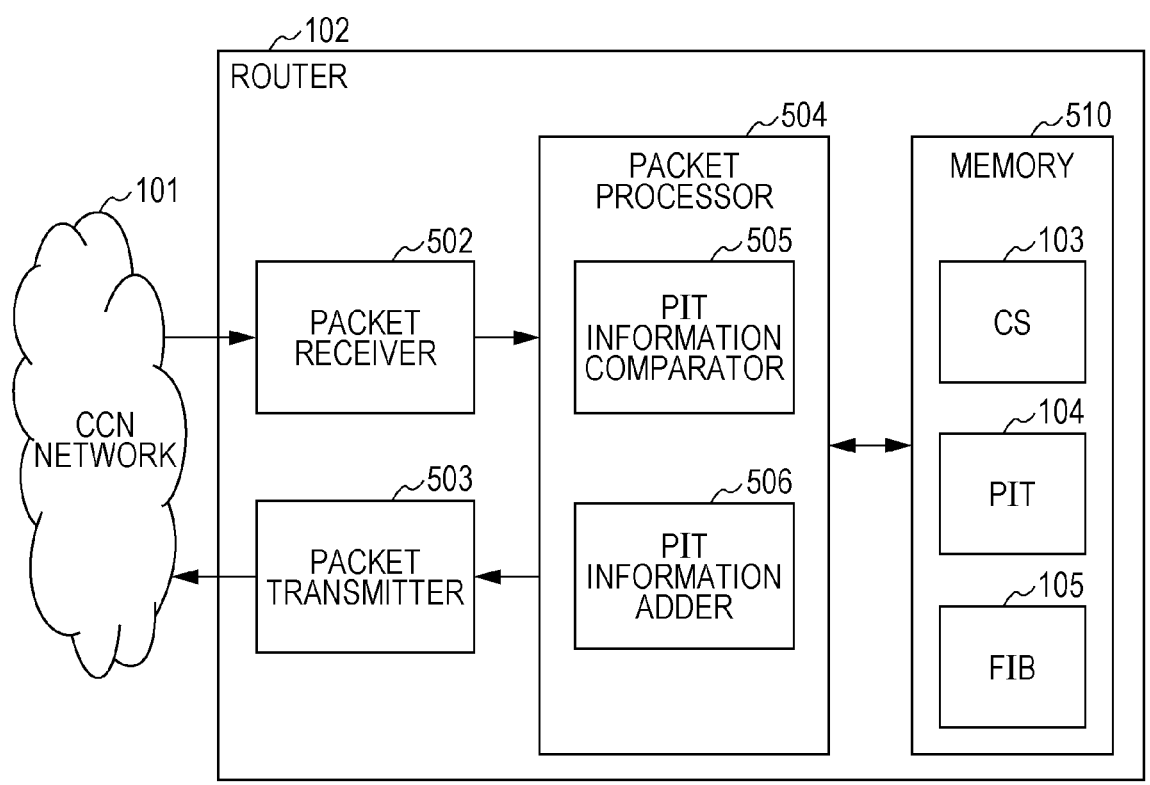
FIG. 5 is a diagram illustrating an example of the functional configuration of a router.

Next, the configuration of the router 102 will be described in detail. FIG. 5 is a diagram illustrating an example of the functional configuration of the router 102. The router 102 includes a central processing unit (CPU), a memory including a random access memory (RAM) and a read only memory (ROM), and a communication interface (face), which are not illustrated. Individual processing units 502 to 506 illustrated in FIG. 5 are implemented by causing the CPU to execute programs to function as the processing units 502 to 506 stored in the memory. The processing units 502 to 506 illustrated in FIG. 5 may be implemented by combining dedicated circuits functioning as the processing units 502 to 506. A memory 510 is implemented by a storage area of the foregoing memory.

A packet receiver 502 (receiver) and a packet transmitter 503 (transmitter) are connected to the CCN network 101 via the above-described interface (face) and receive and transmit interest packets and data packets. The packets received from/transmitted to the CCN network 101 by the packet receiver 502 and the packet transmitter 503 are not limited to interest packets and data packets. The received/transmitted packets may include, for example, a control packet for exchanging routing information and a negative acknowledgement (NACK) packet indicating that content does not exist or a network is in congestion.

A packet processor 504 is connected to the packet receiver 502, the packet transmitter 503, and the memory 510, and determines a method for processing packets received and transmitted by the packet receiver 502 and the packet transmitter 503 by using information stored in the memory 510. Furthermore, the packet processor 504 also functions as a PIT information comparator 505 (packet processor) and a PIT information adder 506 (packet processor), which will be described below.

The memory 510 stores the above-described CS 103, PIT 104, and FIB 105.

Hereinafter, a detailed description will be given of an operation that is performed when the router 102 or the client 100 receives a packet in the communication control system according to the first embodiment, with reference to FIGS. 5 to 9. Note that the description of a process similar to the process described in detail with reference to FIG. 4 is simplified.

Figure 6:
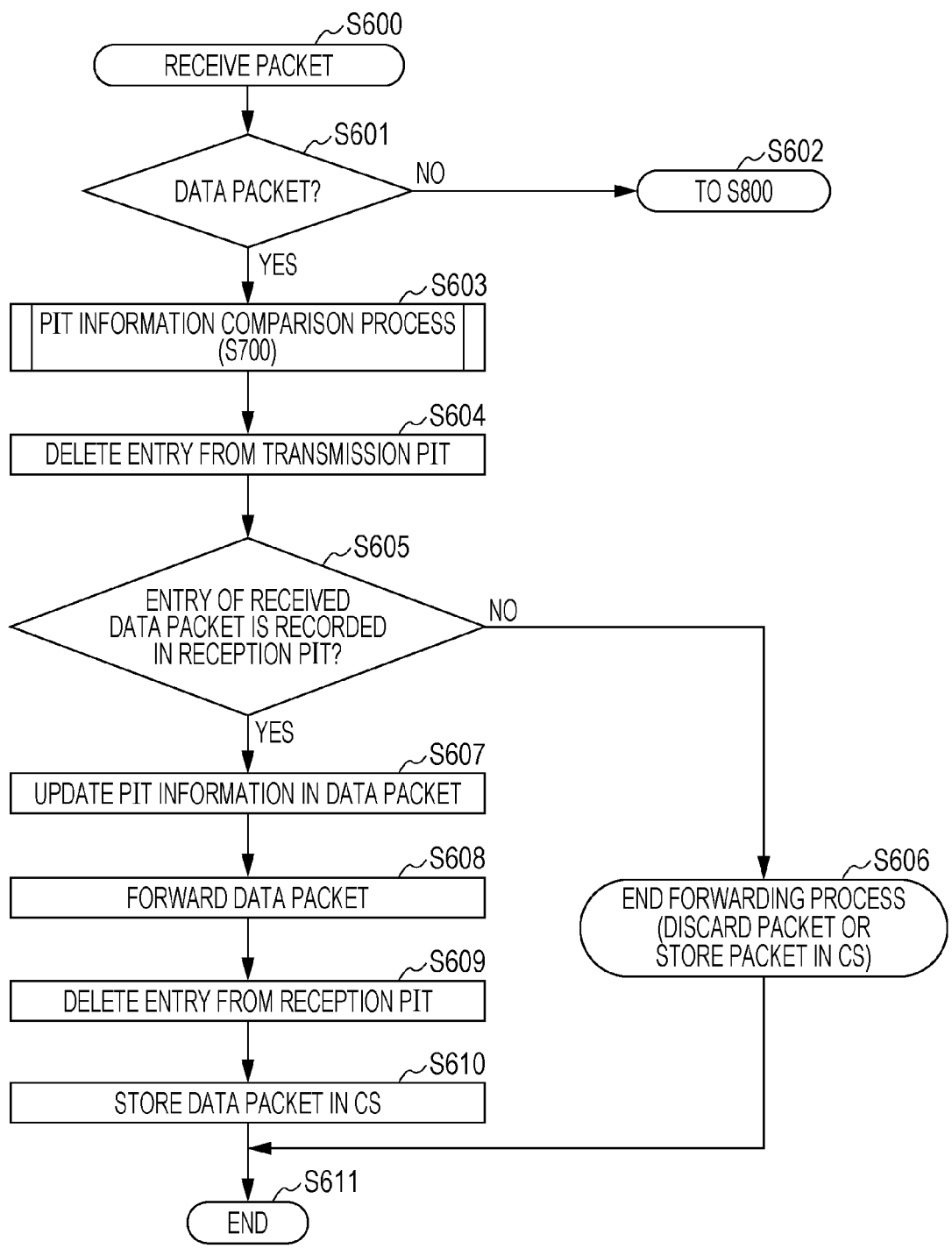
FIG. 6 is a flowchart illustrating an example of an operation in which the router processes a packet.

FIG. 6 is a flowchart illustrating an example of the operation of processing a packet performed by the router 102. Referring to FIG. 6, the process flow is started upon reception of a packet by the packet receiver 502 (S600). The packet processor 504 determines whether or not the packet received by the packet receiver 502 in step S600 is a data packet (S601).

Specifically, in step S601, the packet processor 504 refers to information representing the type of packet stored in a header region of the packet used in CCN, and determines whether or not the received packet is a data packet on the basis of whether or not the information represents a data packet. The format of a packet used in CCN will be described below.

If the packet processor 504 determines that the received packet is not a data packet (NO in S601), the packet processor 504 performs step S800 described below (S602). If the packet processor 504 determines that the received packet is a data packet (YES in S601), the packet processor 504 calls a PIT information comparison process (S700) described below (S603).

Subsequently, the packet processor 504 deletes the entry corresponding to the data packet received ins step S600 from the transmission PIT 205 in the PIT 104, as described above with reference to FIG. 2 (S604). Subsequently, the packet processor 504 determines whether or not the entry corresponding to the data packet received in step S600 is recorded in the reception PIT 204 of the router 102 (S605).

If the packet processor 504 determines that the entry is not recorded (NO in S605), the packet processor 504 does not forward the data packet received in step S600 and stores the data packet in the CS 103. Accordingly, if an interest packet requesting the content formed of the data packet is received thereafter, the data packet can be obtained from the CS 103 and can be forwarded. If the data packet received in step S600 has already been stored in the CS 103, the data packet is discarded (S606). The packet processor 504 then ends the packet forwarding process (S611).

On the other hand, if the packet processor 504 determines that the entry is recorded (YES in S605), the PIT information adder 506 updates the PIT information included in the data packet, as preparation for forwarding the data packet received in step S600 to a lower router 102 (S607).

Specifically, in step S607, the PIT information adder 506 deletes the PIT information included in the data packet. Subsequently, the PIT information adder 506 extracts the face 203 included in the entry that is recorded in the reception PIT 204 of the router 102 and that corresponds to the data packet, as in step 413 in FIG. 4, and thereby specifies the face indicated by the extracted face 203 as the face from which the data packet is to be sent out. Subsequently, the PIT information adder 506 includes, in the data packet, the name 202 included in the entry that is recorded in the reception PIT 204 of the router 102 and that includes the face 203 identical to the extracted face 203, as PIT information. After that, the PIT information adder 506 ends step S607.

Subsequently, the packet processor 504 causes the packet transmitter 503 to forward the data packet received in step S600 to the lower router 102 (S608). Specifically, in step S608, the packet processor 504 instructs the packet transmitter 503 to send out, by using the face specified in step S607, the data packet received in step S600. Accordingly, the packet transmitter 503 causes the face specified in step S607 to send out the data packet. As a result, the data packet is forwarded to the lower router 102.

The packet processor 504 deletes the entry corresponding to the data packet forwarded in step S608 from the reception PIT 204 of the router 102 in a manner similar to that of the step performed after step 413 in FIG. 4 (S609). Subsequently, the packet processor 504 stores the data packet identical to the data packet forwarded in step S608 in the CS 103 (S610). After that, the packet processor 504 ends the packet forwarding process (S611).

Figure 7:
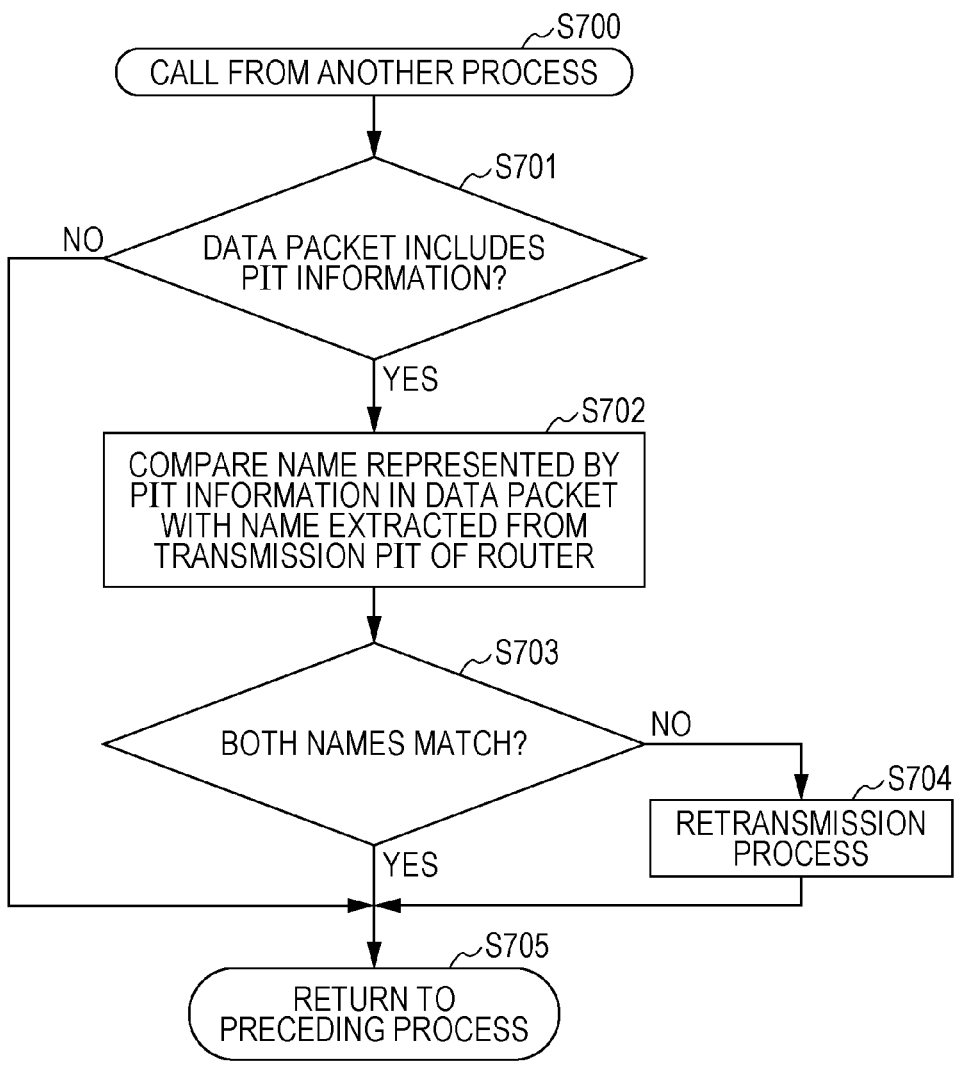
FIG. 7 is a flowchart illustrating an example of a PIT information comparison process.

Next, the details of the PIT information comparison process (S700) performed in step S603 will be described with reference to FIG. 7. FIG. 7 is a flowchart of the PIT information comparison process (S700).

Upon the PIT information comparison process being called by the packet processor 504 (S700), the PIT information comparator 505 determines whether or not the data packet received in step S600 includes PIT information (S701).

There is a possibility that the data packet received in step S600 may be a data packet transmitted from the publisher 106 of a communication control system different from the communication control system according to the first embodiment, and that the data packet may not include PIT information. Thus, if the PIT information comparator 505 determines in step S701 that the data packet does not include PIT information (NO in S701), the PIT information comparator 505 determines that the data packet is a data packet transmitted from an apparatus of another communication control system and ends the PIT information comparison process. Accordingly, the process returns to the preceding process (S705).

If step S607 is performed after returning to the preceding process, PIT information is included in the data packet, and the data packet including the PIT information is forwarded to a lower apparatus in step S608. As a result, the lower apparatus is able to detect packet loss.

On the other hand, if the PIT information comparator 505 determines in step S701 that the data packet includes PIT information (YES in S701), the PIT information comparator 505 extracts the name 202 from an entry including the face 203 identical to the face 203 indicating the face that has received the data packet among the entries of the transmission PIT 205 of the router 102. Subsequently, the PIT information comparator 505 compares the name 202 represented by the PIT information included in the data packet with the name 202 extracted from the transmission PIT 205 of the router 102 (S702).

As a result of the comparison in step S702, if the name 202 extracted from the transmission PIT 205 does not match the name 202 represented by the PIT information included in the data packet (NO in S703), the PIT information comparator 505 detects that loss of a data packet forming the content with the name 202 that does not match has occurred in the forwarding path between the router 102 and an upper apparatus. In this case (NO in S703), the packet processor 504 causes the packet transmitter 503 to retransmit the interest packet corresponding to the data packet forming the content with the name 202 that does not match in accordance with the entry of the transmission PIT 205, as in step 422 in FIG. 4, and ends the PIT information comparison process (S704). Accordingly, the process returns to the preceding process (S705).

On the other hand, as a result of the comparison in step S702, if the name 202 extracted from the transmission PIT 205 matches the name 202 represented by the PIT information included in the data packet (YES in S703), the PIT information comparator 505 determines that no packet loss has occurred and ends the PIT information comparison process. Accordingly, the process returns to the preceding process (S705).

Figure 8:
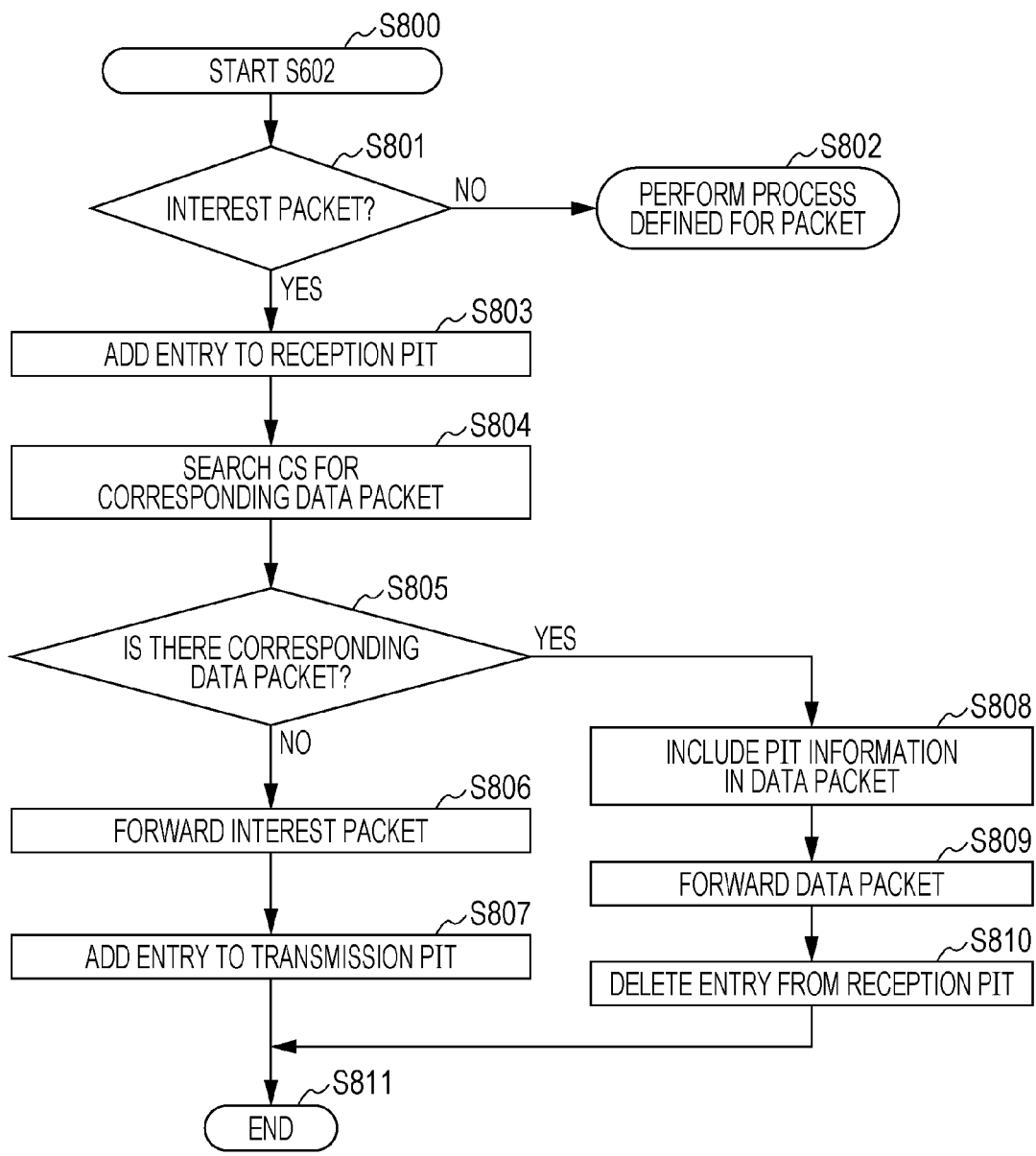
FIG. 8 is a flowchart illustrating an example of an operation that is performed by the router in response to reception of a packet other than a data packet.

Next, a description will be given of the details of the process that is performed in step S602 if the router 102 receives a packet other than a data packet corresponding to an interest packet, with reference to FIG. 8. FIG. 8 is a flowchart illustrating the process that is performed when the router 102 receives a packet other than a data packet corresponding to an interest packet.

Upon step S602 being started (S800), the packet processor 504 determines whether or not the packet received by the packet receiver 502 in step S600 is an interest packet (S801).

Specifically, in step S801, the packet processor 504 refers to the information representing the type of packet included in a header region of the packet used in CCN. The packet processor 504 determines whether or not the received packet is an interest packet on the basis of whether or not the information represents an interest packet. The format of the packet used in CCN will be described below.

If the packet processor 504 determines that the received packet is not an interest packet (NO in S801), the packet processor 504 performs a predetermined process defined for the received packet and ends the process (S802).

On the other hand, if the packet processor 504 determines that the received packet is an interest packet (YES in S801), the packet processor 504 adds an entry indicating that the interest packet has been received to the reception PIT, as in steps 408 and 409 in FIG. 4 (S803). Subsequently, the packet processor 504 searches the CS 103 for a data packet corresponding to the interest packet (S804).

If the data packet corresponding to the interest packet is not stored in the CS 103 (NO in S805), the packet processor 504 instructs the packet transmitter 503 to forward the interest packet to an upper apparatus by using the face to be used for communication with the upper apparatus, as in steps 408 and 409 in FIG. 4 (S806). Accordingly, the interest packet is forwarded to the upper apparatus. Subsequently, the packet processor 504 records an entry indicating that the interest packet has been sent out in the transmission PIT 205 (S807) and ends the process (S811).

On the other hand, if the packet processor 504 determines that the data packet corresponding to the interest packet is stored in the CS 103 (YES in S805), the PIT information adder 506 obtains the data packet from the CS 103 and includes, in the data packet, the PIT information obtained from the entry recorded in the reception PIT 204 as in step S607 (S808). In step S808, the PIT information adder 506 specifies the face that transmits the data packet, as in step S607.

Subsequently, the packet processor 504 causes the packet transmitter 503 to forward the data packet to a lower apparatus (S809). Specifically, in step S809, the packet processor 504 instructs the packet transmitter 503 to send out, by using the face specified in step S808, the data packet in which the PIT information is included in step S808. Accordingly, the packet transmitter 503 causes the face specified by the step S808 to send out the data packet. As a result, the data packet is forwarded to the lower router 102.

Subsequently, the packet processor 504 deletes the entry of the reception PIT 204 corresponding to the forwarded data packet (S810) and ends the process (S811).

The description has been given of the process flow in the router 102. In the case of applying the packet loss detection method in the router 102 to the client 100 and the publisher 106, the client 100 and the publisher 106 may be configured as follows.

Specifically, the client 100 and the publisher 106 may include processing units 502 to 506 and a memory 510 similar to those of the router 102 illustrated in FIG. 5.

In the client 100, after the packet transmitter 503 of the client 100 (hereinafter referred to as a packet transmitter 503a) transmits an interest packet, the packet processor 504 of the client 100 (hereinafter referred to as a packet processor 504a) may add, to the transmission PIT 205 of the client 100, an entry indicating that the interest packet has been sent out, as in step S807.

Figure 9:
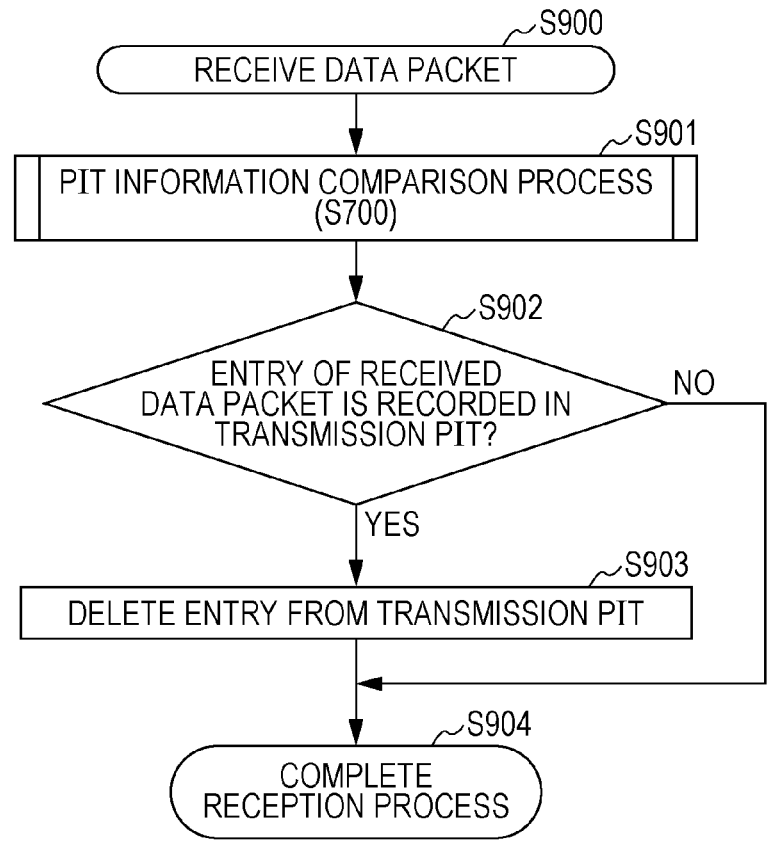
FIG. 9 is a flowchart illustrating an example of an operation that is performed by a client in response to reception of a data packet.

The operation of processing a data packet by the client 100 may be performed in the following manner. FIG. 9 is a flowchart illustrating the process performed by the client 100 in response to reception of a data packet.

When the packet receiver 502 of the client 100 (hereinafter referred to as a packet receiver 502a) receives a data packet (S900), the packet processor 504a calls the PIT information comparison process S700 (S901). Accordingly, the PIT information comparator 505 of the client 100 performs the PIT information comparison process in accordance with the process flow illustrated in FIG. 7. As a result, the client 100 is able to perform packet loss detection, and, if packet loss is detected, the client 100 is able to perform the retransmission process in step S704.

Subsequently, the packet processor 504a determines whether or not the entry corresponding to the data packet received in step S900 is recorded in the transmission PIT 205 of the client 100 (S902).

If the packet processor 504a determines in step S902 that the entry is not recorded (NO in S902), the reception process is completed (S904). On the other hand, if the packet processor 504a determines in step S902 that the entry is recorded (YES in S902), the packet processor 504a deletes the entry corresponding to the data packet received in step S900 from the transmission PIT 205 (S903) as described above with reference to FIG. 2, and completes the reception process (S904).

On the other hand, in the publisher 106, the packet receiver 502 of the publisher 106 may receive an interest packet and then the packet processor 504 of the publisher 106 (hereinafter referred to as a packet processor 504b) may add an entry indicating that the interest packet has been received to the reception PIT 204 of the publisher 106 as in step S803.

In a case where the packet transmitter 503 of the publisher 106 (hereinafter referred to as a packet transmitter 503b) transmits a data packet, the PIT information adder 506 of the publisher 106 may include, in the data packet, PIT information obtained from an entry of the reception PIT 204 of the publisher 106, and then the packet processor 504b may cause the packet transmitter 503b to transmit the data packet, as in steps S808 and S809. After the data packet is sent out, the packet processor 504b may delete the entry corresponding to the data packet from the reception PIT 204 of the publisher 106, as in step S810.

Figure 10:
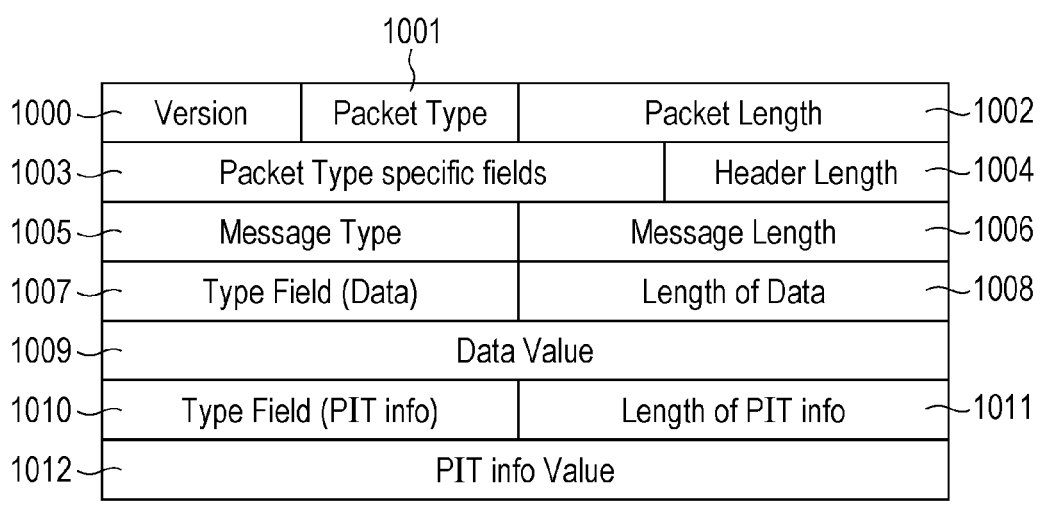
FIG. 10 is a diagram illustrating an example of a format of a packet used in CCN.

Next, the format of a packet used in CCN will be described. FIG. 10 is a diagram illustrating an example of the format of a packet used in CCN. As illustrated in FIG. 10, the data packet includes a header region (1000 to 1006) and a message region (1007 to 1012). The header region (1000 to 1006) is the same in all the packets used in CCN, whereas the message region (1007 to 1012) varies according to the type of packet.

A region 1000 (hereinafter referred to as a version region 1000) stores information representing the version of the packet. A region 1001 (hereinafter referred to as a type region 1001) stores information representing the type of the packet. For example, the type region 1001 stores information indicating whether the packet is an interest packet or a data packet. That is, in the above-described steps S601 and S801, the type region 1001 is referred to. A region 1002 stores a packet length. A region 1003 stores information specific to the type of the packet. A region 1004 stores a header length. A region 1005 stores information identifying the information or data stored in the message region. A region 1006 stores a message length.

For example, if the packet is the above-described data packet, the type region 1001 stores an identifier identifying that the packet is a data packet. The region 1005 stores the name of content. The message region (1007 to 1012) includes regions 1007 to 1009 and regions 1010 to 1012. The regions 1007 to 1009 store data of content formed of the data packet and information about the data. The regions 1010 to 1012 store PIT information and data representing the PIT information.

Specifically, the region 1007 stores an identifier identifying the data of content, the region 1008 stores the data length of the content, and the region 1009 stores data forming the content. The region 1010 stores an identifier identifying PIT information, the region 1011 stores the data length of the PIT information, and the region 1012 stores the PIT information.

On the other hand, if the packet is the above-described interest packet, the type region 1001 stores an identifier identifying the interest packet. The region 1005 stores the name of content requested by the interest packet. The message region (1007 to 1012) is not used or does not exist.

Second Embodiment: Compression of PIT Information to be Transmitted

In the first embodiment, in a case where an apparatus includes PIT information in a data packet to be transmitted, the apparatus extracts the face 203 included in the entry corresponding to the data packet from the reception PIT 204 of the apparatus, extracts the name 202 from all the entries including the face 203 identical to the extracted face 203 among the entries of the reception PIT 204 of the apparatus, and regards the extracted name as PIT information. However, it is not always necessary to include, in all data packets to be transmitted, the name 202 extracted from all the entries as PIT information. The size of the PIT information included in the data packet to be transmitted may be reduced as described below.

For example, content with the name "a" (content "a") may include content segments with sequential sub-hierarchical names "a/1", "a/2", "a/3", and so forth. It is assumed that the content "a" includes three content segments with the names "a/1", "a/2", and "a/3" (a content segment "a/1", a content segment "a/2", and a content segment "a/3"). Also, it is assumed that content with the name "b" (content "b") includes three content segments with the names "b/1", "b/2", and "b/3" (a content segment "b/1", a content segment "b/2", and a content segment "b/3").

Furthermore, it is assumed that the client 100 transmits six interest packets requesting the three content segments "a/1", "a/2", and "a/3" forming the content "a" and the three content segments "b/1", "b/2", and "b/3" forming the content "b" in order to obtain the content "a" and the content "b".

Accordingly, it is assumed that an entry "i[a/1, a/2, a/3, b/1, b/2, b/3(eth0)]" is recorded in the reception PIT 204 of the router 102, and that the router 102 forwards, by using the face "eth0", a data packet "D:a/1" forming the content segment "a/1" among the three data packets forming the content "a".

In this case, the packet processor 504 of the router 102 may extract the names 202 "a/1", "a/2", and "a/3" from only the entry "i[a/1, a/2, a/3(eth0)]" corresponding to the data packets forming the content "a" (the data packets forming the content segments "a/1", "a/2", and "a/3") among the entries including the face "eth0" stored in the reception PIT 204, and may include the extracted names 202 as PIT information in the data packet "D:a/1".

In other words, the packet processor 504 of the router 102 may not extract the names 202 "b/1", "b/2", and "b/3" from the entry "i[b/1, b/2, b/3(eth0)]" corresponding to the data packets forming the content "b" (the data packets forming the content segments "b/1", "b/2", and "b/3") different from the content "a" formed of the data packet "D:a/1" to be forwarded among the entries including the face "eth0" stored in the reception PIT 204, so that the size of the PIT information may be reduced.

In this way, in the case of transmitting a plurality of data packets forming one piece of content, the packet processor 504 may include, in the data packets to be transmitted, only the names 202 included in the entry recorded in the reception PIT 204 and corresponding to (related to) the data packets forming the content as PIT information.

Accordingly, in the case of continuously transmitting a plurality of data packets forming one piece of content in a concentrated manner for a certain period, the names 202 included in the entry recorded in the reception PIT 204 and corresponding to the data packets forming another piece of content may be prevented from being included as PIT information in the data packets to be transmitted. In this way, the size of the PIT information included in the data packets may be reduced and the communication load of the network may be reduced in the certain period.

Note that, in the case of using this method, it is necessary for the apparatus that receives the data packets to identify that the PIT information included in the data packets is reduced. Also, it is necessary to reduce the names 202 extracted from the entry of the transmission PIT 205, which are to be compared with the names represented by the PIT information included in the received data packets in step S702, as well as the PIT information. This may be realized in the following manner.

For example, in a case where the packet processor 504 includes PIT information in a data packet, an identifier identifying PIT information stored in the region 1010 of the packet illustrated in FIG. 10 may be varied between normal PIT information and reduced PIT information. Alternatively, information specific to the data packet stored in the region 1003 of the packet illustrated in FIG. 10 may be varied between normal PIT information and reduced PIT information.

In step S702, the PIT information comparator 505 may determine whether or not the PIT information included in the received data packet is reduced PIT information. If the PIT information comparator 505 determines that the PIT information included in the received data packet is reduced PIT information, the PIT information comparator 505 may extract the name 202 from only the entry corresponding to the data packet forming the content identical to the content formed of the received data packet among the entries of the own transmission PIT 205. Also, the PIT information comparator 505 may compare the extracted name 202 with the name represented by the reduced PIT information so as to detect packet loss.

For example, it is assumed that a data packet "D:a/1, PIT[a/1, a/2, a/3]" is received by the face "eth0" when an entry "o[a/1, a/2, a/3, b/1, b/2, b/3(eth0)]" is in the transmission PIT 205 of the router 102. Also, it is assumed that the PIT information "PIT[a/1, a/2, a/3]" included in the data packet is reduced PIT information.

In this case, the PIT information comparator 505 may determine, in step S702, whether or not the PIT information included in the received data packet is reduced PIT information by referring to the region 1010 or the region 1003 of the received data packet.

If it is determined that the PIT information included in the received data packet is reduced PIT information, the PIT information comparator 505 may grasp the content formed of the received data packet. In this specific example, it can be determined that the received data packet is a data packet forming the content "a" on the basis of the prefix of the name "a/1" of the content segment formed of the received data packet.

Subsequently, the PIT information comparator 505 may extract the names 202 "a/1", "a/2", and "a/3" from only the entry "o[a/1, a/2, a/3(eth0)]" corresponding to the data packets forming the content "a" among the entries of the own transmission PIT 205. Subsequently, the PIT information comparator 505 may compare the extracted names 202 "a/1", "a/2", and "a/3" with the names "a/1", "a/2", and "a/3" represented by the reduced PIT information "PIT[a/1, a/2, a/3]".

In the case of continuously receiving a plurality of data packets forming one piece of content in a concentrated manner in a certain period, only packet loss of data packets forming the piece of content can be intensively detected by using the reduced PIT information included in the received data packets and the entry recorded in the transmission PIT 205 and corresponding to the data packets forming the piece of content in the certain period.

In a case where the PIT information to be included in the data packet "D:a" is "PIT[a, b]", the name "a" of content represented by the PIT information is the same as the name of the content formed of the data packet. Thus, in such a case where the name of content represented by the PIT information includes the name of content formed of the data packet, it is not necessary to include, in the PIT information, the name of content formed of the data packet. That is, in the above-described example, the PIT information included in the data packet "D:a" may be "PIT[b]", instead of "PIT[a, b]". In this way, the PIT information included in the data packet may be reduced.

Note that, also in the case of using this method, it is necessary for the apparatus that receives a data packet to identify that the PIT information included in the data packet is reduced PIT information by using the region 1010 or the region 1003 of the data packet, as described above. Furthermore, in step S702, it is necessary to determine whether or not the PIT information is reduced, and, if the PIT information is reduced, it is necessary to add the name of content formed of the data packet to the name represented by the PIT information included in the received data packet.

In a case where the PIT information to be included in the data packet "D:a" is "PIT[a]", there is no PIT information to be included in the data packet "D:a". As a result, the PIT information comparator 505 determines in step S701 that the data packet does not include PIT information and step S702 is not performed. To avoid this situation, it may be determined in step S701 whether the PIT information is reduced. If it is determined that the PIT information is reduced and that no PIT information is included, step S702 may be performed.

The name represented by the PIT information to be included in the data packet is not necessarily a character string, such as "a" and "b", and may be a hash value of the name represented by the PIT information. However, in this case, the apparatus that receives the data packet needs to compare, in step S702, the hash value represented by PIT information included in the received data packet with the hash value of the name 202 extracted from an entry of the own transmission PIT 205.

Alternatively, the hash value represented by the PIT information may be configured as a Bloom filter corresponding to the name 202 extracted from an entry of the transmission PIT 205. In this case, the apparatus that receives the data packet including the PIT information may determine, in step S702, only that the name 202 extracted from the entry of the own transmission PIT 205 is not included in the name corresponding to the PIT information by using the Bloom filter represented by the PIT information included in the received data packet.

Third Embodiment: Combination of PIT Information and Timeout

In the first and second embodiments, a description has been given of the method of comparing information extracted from an entry of the reception PIT 204 of an upper apparatus with information extracted from an entry of the transmission PIT 205 of the own apparatus in order to detect packet loss.

Alternatively, the packet processor 504 may further set a timeout value for an entry of the own transmission PIT 205, and, if the time period from when the entry is recorded in the transmission PIT 205 to when a data packet corresponding to the entry is received exceeds the timeout value, the packet processor 504 may detect packet loss of the data packet. If the packet processor 504 detects the packet loss, the packet processor 504 may cause the packet transmitter 503 to retransmit an interest packet corresponding to the data packet.

Specifically, the date and time when an entry is recorded and a timeout value for the entry may be recorded in the transmission PIT 205 in association with the entry. When recording an entry in the transmission PIT 205 in step S807, the packet processor 504 may record the date and time when the entry is recorded and the timeout value for the entry in association with the entry.

The packet processor 504 may periodically refer to the entry of the transmission PIT 205. If the time period elapsed from the date and time when the entry is recorded exceeds the timeout value that is associated with the entry, the packet processor 504 may detect packet loss of the data packet corresponding to the entry and may retransmit the interest packet corresponding to the data packet, as in step S704.

In this case, the packet processor 504 needs to be configured to update the date and time associated with the entry that is referred to, to the date and time when the interest packet is retransmitted, so that retransmission of the interest packet is not repeated.

With this configuration, even if loss of a data packet corresponding to a transmitted interest packet bursts and the data packet is not received for a certain period, the interest packet is retransmitted every time the time period elapsed since the entry corresponding to the data packet is recorded in the transmission PIT 205 exceeds the timeout value.

Accordingly, even if loss of the data packet corresponding to the interest packet occurs, the data packet can be appropriately retransmitted. As a result, the data packet can be reliably obtained.

Fourth Embodiment: Measures Against Transmission Delay

Figure 11:
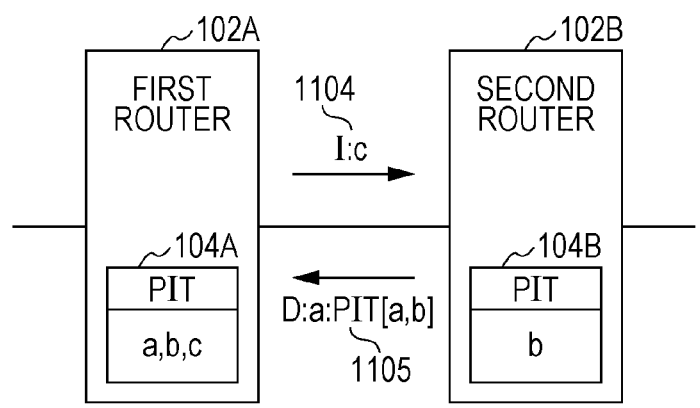
FIG. 11 is a diagram illustrating an example of a situation where an interest packet and a data packet are transmitted and received between two routers in CCN.

FIG. 11 is a diagram illustrating an example of a situation where the first router 102A and the second router 102B in CCN transmit and receive an interest packet 1104 and a data packet 1105. FIG. 11 illustrates a situation where transmission of the interest packet 1104 "I:c" by the first router 102A and forwarding of the data packet 1105 "D:a:PIT[a, b]" by the second router 102B are being performed almost simultaneously.

At this time, an entry of the transmission PIT 205 of the first router 102A is "o[a, b, c]". On the other hand, at the time when the second router 102B has transmitted the data packet 1105, the interest packet 1104 has not arrived at the second router 102B, and thus the PIT information included in the data packet 1105 is "PIT[a, b]". Thus, there is a possibility that packet loss of the data packet corresponding to the interest packet 1104 may be detected when the data packet 1105 is received by the first router 102A although no packet loss actually occurs.

To address such an issue, the PIT information comparator 505 may avoid using the name 202 extracted from an entry that has been recorded for a time period that is equal to or less than a predetermined threshold among the entries of the transmission PIT 205 in the comparison performed in step S702.

For this purpose, the date and time when an entry is recorded may also be recorded in the transmission PIT 205 in association with the entry. At the time of recording an entry in the transmission PIT 205 in step S807, the packet processor 504 may record the date and time when the entry is recorded in association with the entry. The above-mentioned threshold may be determined by, for example, transmitting and receiving a control signal between two adjacent routers 102, measuring a time that is necessary for the data packet to be transmitted and returned, and setting the measured time.

With this configuration, the following advantages are obtained. For example, the following case is assumed. An upper router 102 transmits a data packet. After that, a lower router 102 transmits an interest packet. Subsequently, the lower router 102 receives the data packet and performs step S702 before the time period elapsed since the entry of the transmission PIT 205 indicating that the interest packet has been transmitted is recorded becomes the predetermined threshold.

In this case, the name 202 extracted from the entry of the transmission PIT 205 indicating that the interest packet has been transmitted is not compared with the name represented by the PIT information in step S702. Accordingly, false detection of packet loss of the data packet corresponding to the interest packet can be prevented.

Fifth Embodiment: Reducing Number of Times of Transmission of PIT Information

In the above-described embodiments, an apparatus includes PIT information in a data packet and then transmits the data packet. However, for example, the apparatus may count the number of data packets that have been transmitted thereby, and may transmit a data packet including PIT information every time a predetermined number of data packets not including PIT information have been transmitted. Alternatively, the apparatus may transmit data packets not including PIT information until a predetermined time period elapses since a data packet including PIT information is transmitted, and may transmit a data packet including PIT information after the predetermined time period has elapsed.

Alternatively, the apparatus may transmit a data packet including only PIT information and not including data of content. Specifically, if a lower apparatus transmits an interest packet for a data packet including only PIT information and not including data of content, an apparatus that has received the interest packet may transmit a data packet including only PIT information extracted from an entry of the own reception PIT 204. Alternatively, the apparatus may spontaneously and regularly send out a data packet including only PIT information extracted from an entry of the own reception PIT 204 by using the face included in the entry from which the PIT information has been extracted.

That is, with use of the above-described method, the number of times a data packet including PIT information is transmitted may be reduced, the size of data packets transmitted and received on the CCN network 101 may be reduced, and accordingly the communication load of the network may be reduced.

However, in the case of using the above-described method, it is necessary for the apparatus that receives data packets to identify the information included in each of the data packets. This may be realized by, for example, making the information stored in the region 1010 and the region 1003 of a data packet illustrated in FIG. 10 different among a case where the data packet includes only PIT information, a case where the data packet does not include only PIT information, and a case where the data packet includes PIT information and content, when the apparatus transmits the data packet.

The present disclosure is applicable to a communication control apparatus in a content-oriented network, and is particularly applicable to a router apparatus that relays data, a client apparatus that receives data, and a publisher that provides data.

What is claimed is:

1. A communication control apparatus connected to a content-oriented network, the communication control apparatus comprising:

a communication interface that transmits an interest packet to a transmission source, the interest packet requesting a plurality of pieces of content, the interest packet including names of the plurality of pieces of content, the plurality of pieces of content including a first piece of content and a second piece of content;

a processor that registers, in response to transmission of the interest packet by the communication interface, the names of the plurality of pieces of content requested by the interest packet in a first pending interest table (PIT);

a memory that stores the first PIT, in which the names of the plurality of pieces of content requested by the interest packet are registered;

the communication interface that further receives a first data packet from the transmission source, the first data packet including the first piece of content and second PIT information, the second PIT information identifying at least one non-transmitted piece of content, which has not yet been transmitted by the transmission source, among the plurality of pieces of content;

the processor that further deletes, in response to reception of the first data packet by the communication interface, a name of the first piece of content included in the first data packet from the names of the plurality of pieces of content registered in the first PIT;

the processor that further compares the second PIT information included in the first data packet with the first PIT; and the processor that further detects packet loss when: a name of the second piece of content registered in the first PIT is not in the second PIT information; and the second piece of content is not included in the first data packet.

2. The communication control apparatus according to claim 1, wherein the communication interface further receives the interest packet, the communication interface further transmits a second data packet, the memory further stores a reception PIT in which the names of the plurality of pieces of content requested by the interest packet are registered, and the processor further:

generates the second data packet including the first piece of content included in the first data packet and the reception PIT; and registers the names of the plurality of pieces of content requested by the interest packet in the reception PIT, and deletes, in response to transmission of the second data packet, the name of the first piece of content included in the second data packet from the names of the plurality of pieces of content registered in the reception PIT.

3. The communication control apparatus according to claim 2, wherein the processor:

registers or deletes a set of the names of the plurality of pieces of content requested by the interest packet and face information representing the communication interface that received the interest packet, in the reception PIT or from the reception PIT; and generates the second data packet by using a first reception PIT that matches first face information corresponding to the first piece of content.

4. The communication control apparatus according to claim 1, wherein the processor causes the communication interface to transmit a further interest packet requesting the second piece of content when the packet loss is detected.

5. The communication control apparatus according to claim 4, wherein the processor does not use, for detecting the packet loss, one of the names of the plurality of pieces of content that has been registered in the first PIT for a predetermined time period.

6. The communication control apparatus according to claim 4, wherein the processor further sets a timeout value to the first PIT, determines that the packet loss has occurred when a time period from when one of the names of the plurality of pieces of content is registered in the transmission PIT to when the communication interface receives a piece of content corresponding to the one of the names exceeds the timeout value, and causes the communication interface to transmit a further interest packet corresponding to the packet loss.

7. The communication control apparatus according to claim 1, wherein
in a case of receiving the first piece of content, that includes a plurality of content segments by using a plurality of data packets, the communication interface receives a second data packet from the transmission source, a first content segment, which is one of the plurality of content segments, and third PIT information being included in the second data packet by the transmission source, the third PIT information representing a name of a second content segment, the second content segment being one of the plurality of content segments corresponding to the interest packet and not being included in the second data packet by the transmission source, and
the processor registers, in response to the transmission of the interest packet by the communication interface, names of the plurality of content segments of the plurality of pieces of content requested by the interest packet in the first PIT, deletes, in response to reception of the second data packet by the communication interface, a name of the first content segment included in the second data packet from the names of the plurality of content segments of the plurality of pieces of content registered in the first PIT, compares the third PIT information included in the second data packet with the first PIT, and detects the packet loss based on comparison of the third PIT information included in the second data packet and the first PIT.

8. The communication control apparatus according to claim 7, wherein
in a case where the communication interface transmits the first piece of content that includes the plurality of content segments by using the plurality of data packets,
the communication interface further receives the interest packet,
the communication interface further transmits a third data packet,
the memory further stores a reception PIT in which the names of the plurality of content segments of the first piece of content requested by the interest packet are registered, and
the processor:
generates the third data packet including the first content segment included in the second data packet, and the reception PIT; and
registers the names of the plurality of content segments of the first piece of content requested by the interest packet in the reception PIT, and deletes, in response to transmission of the third data packet, the name of the first content segment included in the third data packet from the names of the plurality of content segments registered in the reception PIT.

9. The communication control apparatus according to claim 1, wherein the interest packet requesting the plurality of pieces of content includes a plurality of interest packets corresponding to the plurality of pieces of content.

10. A communication control method for a communication control apparatus connected to a content-oriented network, the communication control method comprising:
transmitting, via a communication interface, an interest packet to a transmission source, the interest packet requesting a plurality of pieces of content, the interest packet including names of the plurality of pieces of content, the plurality of pieces of content including a first piece of content and a second piece of content;
registering, by a processor in response to transmission of the interest packet, the names of the plurality of pieces of content requested by the interest packet in a first pending interest table (PIT);
storing, in a memory, the first PIT, in which the names of the plurality of pieces of content requested by the interest packet are registered;
receiving, via the communication interface, a first data packet from the transmission source, the first data packet including the first piece of content and second PIT information, the second PIT information identifying at least one non-transmitted piece of content, which has not been transmitted by the transmission source yet, among the plurality of pieces of content;
deleting, by the processor in response to reception of the first data packet, a name of the first piece of content included in the first data packet from the names of the plurality of pieces of content registered in the first PIT;
comparing, by the processor, the second PIT information included in the first data packet with the first PIT; and
detecting, by the processor, packet loss when: a name of the second piece of content registered in the first PIT is not in the second PIT information; and the second piece of content is not included in the first data packet.

* * * * *